United States Patent
Sasauchi et al.

(10) Patent No.: US 8,470,224 B2
(45) Date of Patent: Jun. 25, 2013

(54) METHOD OF MANUFACTURING SHEET FOR FOOD CONTAINERS

(75) Inventors: Katsuro Sasauchi, Osaka (JP); Reiichi Konishi, Osaka (JP)

(73) Assignee: Nakamoto Packs Co., Ltd., Osaka (JP)

( * ) Notice: Subject to any disclaimer, the term of this patent is extended or adjusted under 35 U.S.C. 154(b) by 90 days.

(21) Appl. No.: 13/042,786

(22) Filed: Mar. 8, 2011

(65) Prior Publication Data

US 2011/0221097 A1 Sep. 15, 2011

(30) Foreign Application Priority Data

Mar. 9, 2010 (JP) .................................. 2010-51749

(51) Int. Cl.
  *B29C 47/78* (2006.01)
(52) U.S. Cl.
  USPC .................................................... 264/211.24
(58) Field of Classification Search
  USPC .................................................... 264/211.24
  See application file for complete search history.

(56) References Cited

U.S. PATENT DOCUMENTS

2004/0138381 A1  7/2004  Blasius, Jr. et al.

FOREIGN PATENT DOCUMENTS

| EP | 0984027 A1 | 3/2000 |
| EP | 1293527 B1 | 3/2005 |
| JP | 2004-155968 | * 6/2004 |
| WO | WO 01/21373 A1 | 3/2001 |

OTHER PUBLICATIONS

Aoyanagi et al., "Manufacture of recovered polyester resin used for bottles, involves mixing raw material of specific composition, degassing, promoting viscosifying reaction and stabilizing viscosifying reaction", AN 2004-491005, Thomson Scientific, London, GB, Jun. 3, 2004, XP002650617, 2 pages.

Extended European Search Report dated Jul. 28, 2011, for Application No. 11156947.1.

* cited by examiner

*Primary Examiner* — Larry Thrower

(74) *Attorney, Agent, or Firm* — Birch, Stewart, Kolasch & Birch, LLP

(57) ABSTRACT

This invention relates to a method of manufacturing sheet for food containers, which comprises:

adding a chain extender to moist flakes of recovered PET;
  charging the flakes of recovered PET containing the chain extender into an extruder having two or more vent holes,
  melting and kneading the flakes of recovered PET with sucking to degas through the vent holes, while molecular chains of the recovered PET of which the molecular weight has been lowered are bonded to each other by the chain extender to render the molecular weight higher, and simultaneously, ethylene glycol and acetaldehyde, produced during depolymerization by water and heat, are trapped by the chain extender to remove residual aldehydes; and
  extruding the recovered PET from the extruder into sheet.

4 Claims, 1 Drawing Sheet

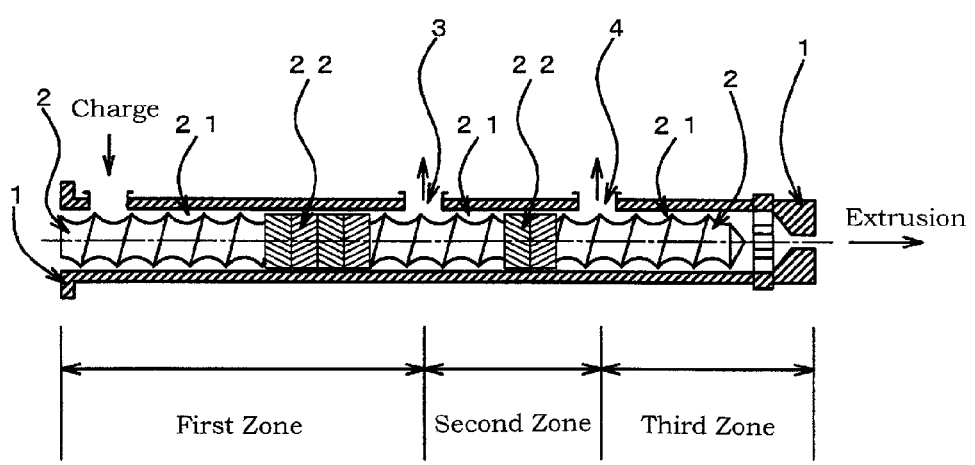

METHOD OF MANUFACTURING SHEET FOR FOOD CONTAINERS

FIELD OF THE INVENTION

This invention relates to a method of manufacturing sheet for food containers, and more particularly, relates to a method of manufacturing sheet for food containers using flakes of recovered PET prepared from PET bottles or PET trays, which improves properties of sheet for food containers and renders residual acetaldehyde free.

BACKGROUND OF THE INVENTION

Recently, containers made of PET resin represented by PET bottles and PET trays are used in a large quantity due to its excellent mechanical strength, transparency and high food safety and sanitation. However, the PET resin once molded into containers had been depolymerized by the heat upon molding to cut molecular chain. The lower molecular weight PET molecules thus produced degrades properties. Accordingly, recovered PET cannot be reused for containers for food again. Then, the recovered PET is recycled only to fiber materials, such as for cotton stuffing and cloths, egg cartons, building materials, or chemical recycles to a part of original chemical raw materials.

Some methods of improving properties of the lower molecular weight PET have been proposed. One method is to render high molecular weight by conducting solid phase polymerization of recovered PET flakes, which have been completely dried, at a temperature of 200° C. or more and a pressure of 7 kPa or less (Japanese Patent No. 4,013,031). Another method is to use a modifier which combines lower molecular chains to render high molecular weight (Japanese Patent Nos. 3,503,952, 4,255,838, JP 2006-176711 A). It is also known to conduct extrusion molding of PET resin without drying (JP 4-278310 A, JP 2004-155968 A).

However, the solid phase polymerization needs complete drying and a high temperature of 200° C. or more for a long time after the drying, which require a large amount of equipment cost and energy cost. The method of using a modifier has a problem of residual acetaldehyde, and is unfavorable in view of food safety and sanitation.

SUMMARY OF THE INVENTION

It is an object of the invention to provide a method of manufacturing sheet for food containers using flakes of recovered PET, which improves properties of the recovered PET resin and renders residual acetaldehyde free.

The inventors investigated eagerly in order to solve the aforementioned problems, and found that, by adding a chain extender to flakes of recovered PET and melting and kneading the flakes in an extruder having two or more vent holes while sucking to degas water, acetaldehyde, etc. from the recovered PET, even though the flakes of recovered PET are not dried up, molecular chains of the lower molecular weight PET can be bonded to each other efficiently to render higher molecular weight, and ethylene glycol generated through depolymerization by water and heat and acetaldehyde generated from ethylene glycol can be trapped, to complete the invention.

Thus, the method of manufacturing sheet for food containers of the invention comprises;

adding a chain extender to moist flakes of recovered PET;
charging the flakes of recovered PET containing the chain extender into an extruder having two or more vent holes, melting and kneading the flakes of recovered PET with sucking to degas through the vent holes, while molecular chains of the recovered PET of which the molecular weight has been lowered are bonded to each other by the chain extender to render the molecular weight higher, and simultaneously, ethylene glycol and acetaldehyde, produced during depolymerization by water and heat, are trapped by the chain extender to remove residual aldehydes; and extruding the recovered PET from the extruder into sheet.

In an aspect of the invention, the above chain extender has two or more epoxy groups.

In another aspect of the invention, the above moist flakes of recovered PET is coated with 0.05 to 0.2 wt. % of liquid paraffin or castor oil prior to adding the chain extender.

In another aspect of the invention, the extruding is carried out by T-die coextrusion or coextrusion by inflation process.

In still another aspect of the invention, the sheet for food containers is formed by coextrusion having a layer construction of recovered PET layer/virgin PET layer located as the innermost layer to contact food, or virgin PET layer/recovered PET layer/virgin PET layer.

In the method of the invention, using flakes of recovered PET without dried up, sheet for food containers is manufactures. Accordingly, a large amount of equipment cost and energy cost for the drying up can be excluded, and the sheet can be produced cheaply.

Since a chain extender is added to the flakes of recovered PET prior to heating and melting in an extruder, molecular chains of the lower molecular weight PET can be bonded to each other by the chain extender immediately after charging into the extruder to render higher molecular weight. Moreover, ethylene glycol generated through depolymerization by water and heat and acetaldehyde generated from ethylene glycol can be bonded to PET molecular chains to trap them by the chain extender.

As the extruder which heats, melts and extrudes the flakes of recovered PET, since an extruder having two or more vent holes is used, ethylene glycol and acetaldehyde which are in gaseous state by the high temperature under ordinary pressure in the extruder, are sucked to remove them from the recovered PET through the vent holes. Accordingly, together with the action of the chain extender, acetaldehyde does not remain in the resin. Moreover, since moisture is also sucked to remove through the vent holes, no problem occurs even using moist flakes of recovered PET without dried up.

In the first aspect, since a chain extender having two or more epoxy groups is used, three-dimensional network structure is formed while binding PET molecular chains, and thereby, properties are improved.

In the second aspect, since the flakes of recovered PET is coated with liquid paraffin or castor oil prior to adding the chain extender, the chain extender can be mixed uniformly. Since it is not necessary to prepare masterbatch, the manufacturing cost of the sheet can be reduced.

In the third aspect, since the extruding is carried out by T-die coextrusion or coextrusion by inflation process, extrusion molding can be conducted simply by using existing equipments.

In the fourth aspect, since the virgin PET layer is located as the innermost layer to contact foods, the recovered PET layer does not contact foods.

BRIEF DESCRIPTION OF THE DRAWINGS

FIG. 1 is a schematic section of the cylinder portion of an extruder having two vent holes applicable to the method of the invention.

1 ... Cylinder
2 ... Screw
3 ... First vent hole
4 ... Second vent hole
21 ... Kneading portion
22 ... Sealing portion

DETAILED DESCRIPTION OF THE INVENTION

The main raw material for manufacturing sheet for food containers is recovered PET materials in the form of containers and the like, for example, PET bottles and trays. The recovered PET materials are first screened, crushed and washed. For example, the recovered PET bottles, trays, and the like are selected by hand by visual observation, and then crushed. The crushed material is subjected to air classification to remove labels, etc., to washing, and then to gravity concentration to remove polyolefins, etc. The crushing is carried out by using a crusher, a cutter or the like to crush the recovered PET materials into flakes preferably having a diameter of about 10 to 20 mm or less. The washing of the crushed PET flakes is conducted typically first by using alkaline water, and then by water. The washed flakes are subjected to centrifugal hydroextraction, and air dried. In this state, the moisture content of the flakes is generally 0.3 to 1.0%, typically 0.3 to 0.5% by weight.

To the moist flakes of recovered PET, a chain extender is added. Illustrative of the chain extender are epoxy compounds, such as glycidyl acrylate, glycidyl methacrylate, trimethylolpropane triglycidyl ether, epoxidized soybean oil, epoxidized linseed oil, and the like. Preferred chain extenders have at least two epoxy groups. By using the chain extender, three-dimensional network structure is formed while binding PET molecular chains, properties are further improved. A preferable amount is 0.2 to 2% by weight of the flakes, and it can be varied in accordance with the performance of the chain extender.

It is preferable to coat the flakes of recovered PET with liquid paraffin, castor oil or the like, preferably in an amount of 0.05 to 2% by weight of the flakes, prior to adding the chain extender. The liquid paraffin, castor oil or the like can be coated on the surface of the flakes of recovered PET by using a Henschel mixer or the like. By coating the flakes with liquid paraffin, castor oil or the like, the chain extender can be added uniformly. As to the particle size of the chain extender, when the size is too small, lumps tend to generate. When the size is too great, distribution tends to be ununiform. Preferable particle size is from about 30 μm to about 300 μm on average, in view of uniform mixing and adhesion.

Although it is possible to prepare masterbatch of the chain extender with PET resin, it increases cost by the preparation of masterbatch. Whereas, by adding the chain extender from the start, the cost can be saved. Moreover, even when depolymerization occurs, the PET molecular chains thus produced can be bonded immediately. The reaction can occur over the full length of the screw of the extruder.

Subsequently, the flakes of recovered PET to which the chain extender has been added, are charged into an extruder having two or more vent holes. The flakes are heated to melt in the extruder, and sucked to degass through the vent holes preferably with a high vacuum degree, such as −750 mmHg or more.

FIG. 1 is a schematic illustration of an extruder having two or more vent holes applicable to the invention. In FIG. 1, numeral 1 indicates the cylinder placed horizontally, and a screw 2 is provided therein. A first vent hole 3 and a second vent hole 4 are formed on the upside of the cylinder 1, locating the first vent hole 3 on the upstream side. The inside of the cylinder 1 is divided into three kneading portions 21 and two sealing portions 22 alternately. A back pressure of 100 to 200 kg/cm$^2$ is added to the molten resin filled in the kneading portion 21, and a high vacuum of −750 mmHg or more is applied the vent holes 3, 4. In the sealing portions 22, the pitch of threads is narrowed than that in the kneading portion 21 to retard the advance of molten resin to form a seal. Moreover, the gap between the innerwall of the cylinder 1 and the upper end of the thread is also narrowed. Thus, the sealing portions 22 prevent slipping away of molten resin through the gap, and force the advance of the molten resin only by rotation of the screw 2 to prevent blown up of the molten resin through the vent holes 3, 4.

Each of the vent holes 3, 4 is connected to an oil-sealed rotary vacuum pump (not illustrated) through a condenser (not illustrated). The condenser is to keep the degree of vacuum, and to maintain the quality of oil in the oil-sealed rotary vacuum pump. If the condenser does not exist, for example, when the flakes of recovered PET having a moisture content of 5,000 ppm are processed at a discharge rate of 500 kg/hr, water vapor is generated at a rate of 500,000 g×0.5/100=2,500 g/hr. As a result, high vacuum cannot be maintained, and oils in the oil-sealed rotary vacuum pump are deteriorated by the contamination of water.

In operation, the flakes of recovered PET are charged into the cylinder 1 of the extruder, and the extruder is worked at a extrusion temperature of 270 to 300° C., typically around 280° C. with a back pressure of 100 to 200 kg/cm$^2$, while sucking to degas from the vent holes 3, 4 with a high vacuum of −750 mmHg or more, to extrude the recovered PET into sheet.

The charged recovered PET is, in the first zone, heated to melt, and kneaded together with the chain extender which has previously been added. It is considered that, in the molten PET, depolymerization occurs through hydrolysis and pyrolysis by water and heat to generate lower molecular PET chains, ethylene glycol and acetaldehyde. However, it is also considered that since chain extender is added from the start and kneaded, the lower molecular PET chains are bonded to produce high molecular weight three-dimensional structure, and polymerization reaction to trap ethylene glycol and acetaldehyde occurs.

That is, cleavage of the epoxy groups

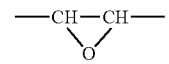

occurs to bond to functional groups, such as carboxyl group (—COOH), aldehyde group (—CHO), or hydroxyl group (—OH), to render the PET molecular chains to high molecular weight molecules with three-dimensional network structure, and ethylene glycol produced by depolymerization and acetaldehyde generated from ethylene glycol are also trapped as a part of the high molecular weight molecules. Moisture contained in the molten PET is in a state of liquid in the back pressure range of 100 kg/cm$^2$ or more, since saturated vapor pressure is 65 kg/cm$^2$ at 280° C.

Then, the molten PET containing ethylene glycol, acetaldehyde and water arrives at the first vent hole 3, since the pressure is rendered high vacuum of −750 mmHg or more there, ethylene glycol (b.p.: 198° C.), acetaldehyde (b.p.: 20° C.) and water (b.p.: 100° C.) are vaporized, and sucked and degased through the first vent hole 3. Whereas, remaining ethylene glycol, acetaldehyde and water, which are not sucked off at the first vent hole 3, are sucked and degased at the second vent hole 4. In the second zone, it is considered that, although depolymerization also occurs partly, in most part, polymerization reaction occurs by the chain extender.

In the third zone, only polymerization reaction occurs by the chain extender. Therefore, acetaldehyde does not newly generate, and the molten PET is extruded in the state free from residual acetaldehyde.

For the production of sheet for food containers, it is preferable that the surface being in contact with contained food is made of virgin PET. For that purpose, the sheet preferably has a multilayer structure of which the innermost layer is a virgin PET layer. Examples of the multilayer structure are virgin PET layer/recovered PET layer and virgin PET layer/recovered PET layer/virgin PET layer. A suitable thickness of the virgin PET layer to contact food is 25 μm or more, preferably 25 to 40 μm. Typical total thickness of the multilayer sheet is 200 to 500 μm.

The multilayer sheet can be manufactured by coextrusion.

EXAMPLE

Recovered PET flakes (moisture content: 4,500 ppm) were prepared from recovered PET bottles and PET trays by screening, crushing, washing, dehydration by a centrifugal hydroextractor, and then, air drying. 0.10% by weight of the flakes by liquid paraffin was added to coat the recovered PET flakes by using a Henschel mixer, and then, a chain extender powder ("ADR 4368S", average particle size; 70 μm, manufactured by BASF Japan) was added in an amount of 0.5% by weight of the flakes, and adhered to the surface of the flakes by stirring the mixture using a Henschel mixer.

The flakes of recovered PET containing the chain extender were charged into a main extruder which was a double-screw extruder wherein the screws rotate in the same direction ("HMT 100", L/D=38, discharge: 650 kg/hr, 2 vent holes, manufactured by Hitachi Zosen Corp.), and extruded at an extrusion temperature of 280° C. while sucking to degas through the vent holes at a vacuum degree of −755 mmHg to form the main layer. Each of the vent holes was connected to an oil-sealed rotary vacuum pump through a condenser.

On the other hand, virgin PET resin ("MA 2101M", moisture content: 2,700 ppm, manufactured by Unitika Ltd.) was charged into a sub-extruder which was a double-screw extruder wherein the screws rotate in the same direction ("HMT 57", L/D 36, discharge: 200 kg/hr, 2 vent holes, manufactured by Hitachi Zosen Corp.), and extruded at an extrusion temperature of 280° C. while sucking to degas through the vent holes at a vacuum degree of −755 mmHg to form sub-layers. Each of the vent holes of the sub-extruder was also connected to an oil-sealed rotary vacuum pump through a condenser. These extrusion was carried out by coextrusion to form a multilayer sheet of virgin PET layer (30 μm)/recovered PET layer (340 μm)/virgin PET layer (30 μm) having a total thickness of 400 μm.

<Behavior of Moisture Content>

While extruding continuously, screws and sucking were temporarily stopped, and resin samples were taken from the position of the first vent hole and the second vent hole of the main extruder and the sub-extruder. Moisture content of each resin sample was measured by using a moisture vaporization apparatus for plastics ("ADP-351" type, manufactured by Kyoto Electronics Manufacturing Co., Ltd.) and a Karl Fischer moisture meter ("MKC-210" type, manufactured by Kyoto Electronics Manufacturing Co., Ltd.). The result are shown in Table 1.

TABLE 1

| Resin | Position | | |
| --- | --- | --- | --- |
| | Before Charging | First Vent Hole | Second Vent Hole |
| Recovered PET | 4,500 ppm | 8 ppm | 0 ppm |
| Virgin PET | 2,700 ppm | 6 ppm | 0 ppm |

As to both the recovered PET and virgin PET, a long quantity of moisture content was decreased to less than 10 ppm at the first vent hole, that clears 50 ppm or less which is essential for the extrusion of conventional PET resin. At the position of the second vent hole, the moisture content was zero, and it can be seen that the sucking to degas through vent holes obviate the need for prior drying.

Subsequently, the coextruded sheet composed of virgin PET/recovered PET/virgin PET was heated to the surface temperature at 130° C., and thereby softened coextruded sheet was molded by vacuum-pressure forming using a vacuum-pressure forming machine ("FKC" type, manufactured by Asano Laboratories, Ltd.) at an air pressure of 0.5 MPa. The served mold was a cavity type aluminum mold having a top of 17.5 cm×12 cm, a bottom of 15 cm×9.5 cm and a depth of 2.5 cm with a flange 1 cm in width, of which the bottom portion and corners were rounded, and the temperature of the aluminum mold was set at 60° C. The food tray thus molded, which was box-shaped narrowed toward the bottom, was clean without deformation, and the form was consistent with the mold.

<Evaluation of Properties by Dropping Strength>

The food tray was filled with 200 ml water, and sealed by covering the open for by a cover material composed by PET film layer (12 μm)/O-NY film layer (15 μm)/easy peel layer (35 μm) followed by heat sealing. The food tray was dropped from 2.0 m height to concrete floor so that the flat bottom portion, long side portion, short side portion or bottom corner portion touched the floor first. The results are shown in Table 2.

TABLE 2

| Dropping End | Number of Food Trays | Number of Damaged Trays |
| --- | --- | --- |
| Flat Bottom | 3 | 0 |
| Long Side | 3 | 0 |
| Short Side | 3 | 0 |
| Bottom Corner | 3 | 0 |

In every dropping direction, the tray was not damaged. Since the height of common shelves in convenience stores is 1.8 m or less. The dropping strength of the tray which can resist a height of 2.0 m, is enough in practical viewpoint.

<Evaluation of Residual Acetaldehyde>

The food tray was cut into pieces of 1 cm×2 cm to prepare many cut pieces of the food tray, and the cut pieces having total surface area of 250 $m^2$, which is the sum of the front side and the rear side, were placed in a 500 ml conical glass flask with a ground-glass stopper. After replacing air in the flask by $N_2$ gas at 40° C. in a room at 40° C. (2 ml $N_2$ gas/1 $cm^2$ surface area). The aperture was stopped by the stopper, and allowed to stand at 40° C. for 24 hours.

The vapor phase in the conical flask after the above treatment was examined by a five member panel as to the presence or absence of foreign odor. Moreover, acetaldehyde in the vapor phase was measured by a gas chromatograph with a FID detector ("GC-6A" type, manufactured by Shimazu Corporation). The result are shown in Table 3 and 4.

TABLE 3

| No. of Panel Members | Presence of Foreign Odor |
|---|---|
| 5 | Non of 5 members felt foreign odor. |

TABLE 4

| Sample | Acetaldehyde |
|---|---|
| Vapor phase in the flask | 0 μg/1 |

The invention claimed is:

1. A method of manufacturing a sheet for food containers, which comprises:

adding a chain extender having two or more epoxy groups to moist flakes of recovered PET;

charging the flakes of recovered PET containing the chain extender into an extruder having three zones and two or more vent holes, said three zones comprising:

a first zone wherein the charged recovered PET is heated to melt and kneaded together with the chain extender, a second zone wherein depolymerization occurs partly in addition to polymerization reaction by the chain extender, and a third zone wherein polymerization reaction occurs by the chain extender, and said two or more vent holes comprising a first vent hole located between the first zone and the second zone, and a second vent hole located between the second zone and the third zone;

melting and kneading the flakes of recovered PET with sucking to degas through the vent holes;

extruding the recovered PET from the extruder into the sheet, and applying the sheet to a food container.

2. The method of claim 1, wherein the moist flakes of recovered PET is coated with 0.05 to 0.2 wt. % of liquid paraffin or castor oil prior to adding the chain extender.

3. The method of claim 1, wherein the extruding is carried out by T-die coextrusion or coextrusion by inflation process.

4. The method of claim 1, wherein in the sheet for food containers is formed by coextrusion having a layer construction of recovered PET layer/virgin PET layer located as the innermost layer to contact food, or virgin PET layer/recovered PET layer/virgin PET layer.

* * * * *